(12) United States Patent
Terhaar et al.

(10) Patent No.: US 6,354,650 B2
(45) Date of Patent: Mar. 12, 2002

(54) REMOTELY OPERATED LOCKING DEVICE FOR A TRUCK TOPPER

(76) Inventors: David L. Terhaar, 4413 128th St., Allegan, MI (US) 49010; David J. Terhaar, 4685 44th St., Holland, MI (US) 49423

( * ) Notice: Subject to any disclaimer, the term of this patent is extended or adjusted under 35 U.S.C. 154(b) by 0 days.

(21) Appl. No.: 09/784,604

(22) Filed: Feb. 15, 2001

Related U.S. Application Data

(63) Continuation-in-part of application No. 09/368,617, filed on Aug. 4, 1999, now abandoned.

(51) Int. Cl.[7] ................................................. B60P 7/02
(52) U.S. Cl. .................. 296/106; 296/100.02; 296/163; 49/394; 292/DIG. 29
(58) Field of Search ..................... 296/56, 106, 146.8, 296/146.15, 163, 164, 100.02; 49/394, 395; 292/DIG. 29

(56) References Cited

U.S. PATENT DOCUMENTS

| 3,636,745 A | 1/1972 | Green |
| 4,825,210 A | 4/1989 | Bachhuber et al. ............ 70/256 |
| 4,907,428 A | 3/1990 | Nakashima et al. ........... 70/264 |
| 5,058,258 A | 10/1991 | Harvey ...................... 70/257 X |
| 5,072,984 A | 12/1991 | Jackson ........................ 296/56 |
| 5,351,512 A | 10/1994 | Pearlman ...................... 70/257 |
| 5,532,521 A | 7/1996 | Leininger ............ 296/146.4 X |
| 5,755,126 A | 5/1998 | Lanigan et al. ................ 70/257 |
| 6,017,077 A | 1/2000 | Duffin ................... 296/100.02 |

Primary Examiner—Joseph D. Pape
(74) Attorney, Agent, or Firm—Price, Heneveld, Cooper, DeWitt & Litton

(57) ABSTRACT

A locking device for a pick-up truck topper, lift-gate or pick-up truck topper window includes an electrically powered actuator and a movable latch mechanically linked to the actuator. The latch is movable between a locked position in which the latch engages the lift-gate or window and locks the lift-gate or window in a closed position, and an unlocked position in which the latch releases the lift-gate or window to allow the lift-gate or window to be swung into an open position.

12 Claims, 5 Drawing Sheets

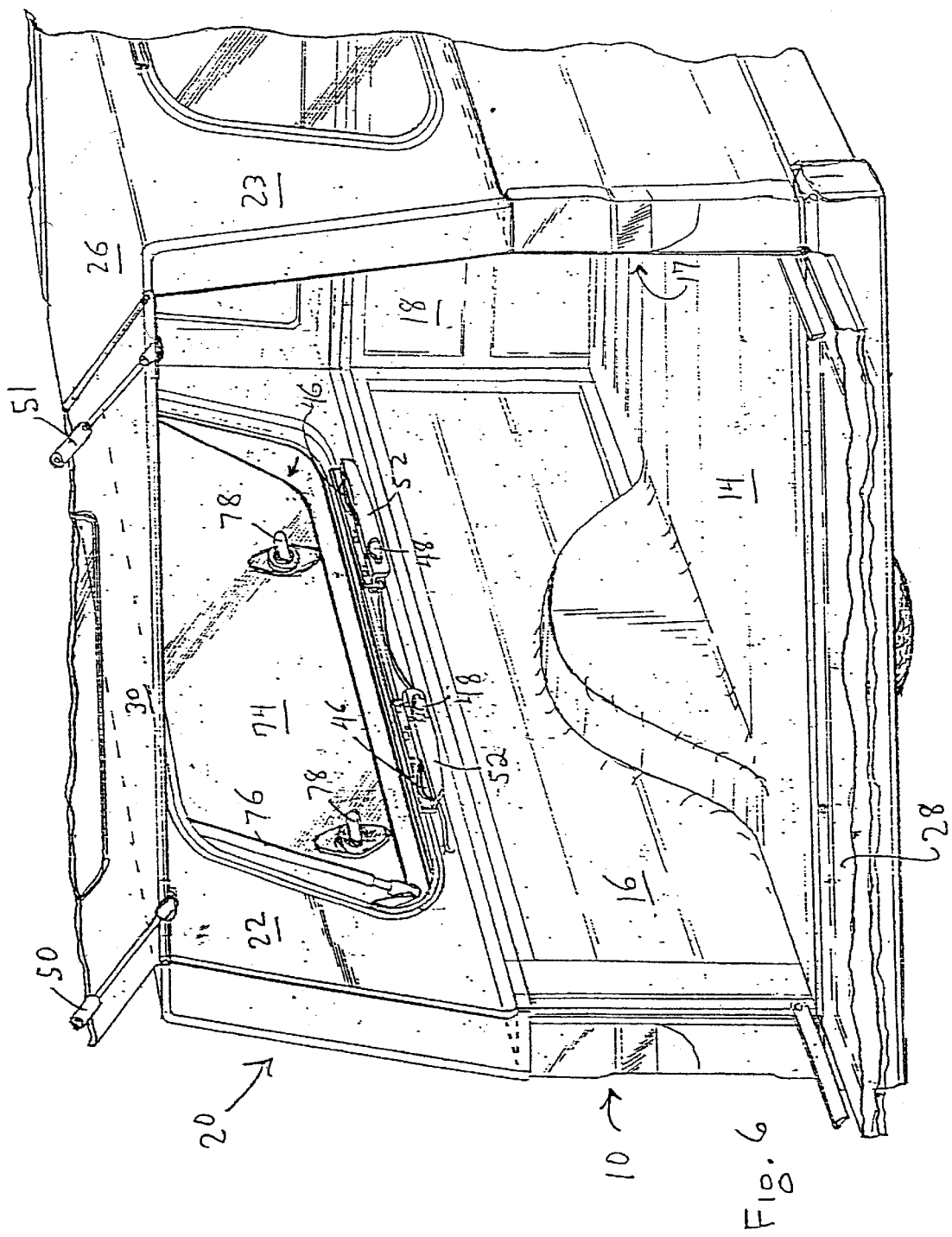

REMOTELY OPERATED LOCKING DEVICE FOR A TRUCK TOPPER

CROSS-REFERENCE TO RELATED APPLICATION

This application is a continuation-in-part of U.S. patent application Ser. No. 09/368,617, filed Aug. 4, 1999, now abandoned.

FIELD OF THE INVENTION

This invention relates to electrically operating locking devices for automotive applications, and more particularly to electrically operated locking devices for pick-up trucks.

BACKGROUND OF THE INVENTION

Pick-up truck owners often find it desirable to protect cargo, tools, equipment or other items stored or being transported in the bed of the pick-up truck from weather (e.g., rain or snow), and from theft or vandalism. A commercially available accessory for pick-up trucks which covers and encloses the bed is commonly referred to as a truck topper. Pick-up truck toppers typically include a one-piece shell-like structure including side and front wall sections which when mounted on the pick-up truck bed extend upwardly from the side and front walls of the bed of the pick-up truck, and a roof section. Pick-up truck toppers also generally include a rear lift-gate which is hingedly connected to the shell-like structure. The one-piece shell, which is generally made of glass fiber reinforced thermoset resin (commonly referred to as "fiberglass"), and lift-gate together provide a substantially weather-tight enclosure which can protect items stored or transported in the bed of the pick-up truck from precipitation and other environmental elements.

The lift-gate of the pick-up truck topper generally includes a conventional barrel-type, key-operated lock which operates a latch mechanism to facilitate locking of the life-gate in a closed position relative to the shell-like structure defining the front wall, side walls and roof of the enclosure defined when the topper is mounted over the bed of a pick-up truck. The lock provides a substantial deterrent against theft and/or vandalism of items contained in the enclosed bed of the pick-up truck.

Although many pick-up truck owners utilizing a topper find the key-operated locking mechanism of the conventional lift-gate of the topper adequate for their needs, many such owners would prefer the convenience of a remotely operated locking device which would allow the lift-gate to be unlocked by merely pressing a button which could for example be located in the truck cabin and/or on a portable remote controller.

In addition to the rear lift-gate, many pick-up truck toppers include one or more side windows which are hingedly connected along an upper edge of the window to a side wall section of the topper. Such windows generally swing open outwardly and are provided with locking devices which can be operated from the inside of the enclosure defined by the topper and the pick-up truck bed. Pick-up truck owners often find it desirable to open the side windows of the topper, especially when the pick-up truck is parked in the sun and/or on a hot day to allow better ventilation of the enclosed space defined by the pick-up truck bed and the topper. This is especially desirable when there are items in the enclosed bed of the pick-up truck which are sensitive to heat or which desirably are maintained at a cooler temperature. It is a relatively cumbersome task to unlock the side windows to allow the windows to swing open. Accordingly, many owners of pick-up trucks with toppers having a side window which swings open would prefer an option which allows the side windows of the topper to be unlocked from outside the enclosure defined by the pick-up truck bed and topper.

U.S. Pat. No. 5,755,126 discloses a security system which is particularly adapted for cargo loading doors for cargo containers, ISO containers, domestic containers, truck trailers and the like. The system comprises a remote transmitter, a receiver for receiving a radio signal from the transmitter, an electromechanical actuator coupled to the receiver for moving a latching device between a locked position and an unlocked position, and a lock assembly including a housing for holding the electromechanical actuator. However, U.S. Pat. No. 5,755,126 does not teach a remotely operated locking mechanism for a pick-up truck topper.

U.S. Pat. No. 5,351,512 discloses an apparatus for locking and unlocking one or more storage compartments in a truck service body. The apparatus includes a rod assembly slidably connected to a plurality of rod supports which are affixed along the interiors of compartments in a truck service body. The rod assembly includes a plurality of L-shaped locking brackets which are arranged to slidably pass through corresponding interior brackets affixed to the doors of the compartments in the truck service body. Each interior bracket includes a hole or an opening that is adapted to receive a corresponding leg when the rod assembly is in its locked position. The rod assembly may be manually moved from its locked to its unlocked position by pulling a handle. An electromechanical actuator is affixed to the interior of one of the compartments in the truck service body and to the rod assembly. The electro-mechanical actuator is activated via a wireless remote controller to move the rod assembly from its locked to its unlocked position. This patent does not teach a remotely operated locking mechanism for a pick-up truck topper.

Accordingly, there remains a need for a remotely operated locking device which allows the lift-gate and/or side windows of a pick-up truck topper to be unlocked, such as from the cabin of the pick-up truck or from a portable remote controller.

SUMMARY OF THE INVENTION

The invention provides a remotely operated locking device for a pick-up truck cargo space closure such as a pick-up truck topper lift-gate, a pick-up truck topper window or a tonneau cover. The device allows a pick-up truck owner to open doors and/or windows of a pick-up truck topper or open a tonneau cover more easily, such as by operating a remote controller, or a switch such as in the cabin of the pick-up truck.

The electrically operated locking device includes an electrically powered actuator and a movable latch mechanically linked to the actuator. The latch is movable between a locked position in which the latch engages a pick-up truck cargo space closure and locks the closure in a closed position, and an unlocked position in which the latch releases the closure to allow the closure to be pivoted into an open position.

BRIEF DESCRIPTION OF THE DRAWINGS

FIG. 6 is a fragmentary, perspective view of the rear portion of a pick-up truck with a pick-up truck topper, with the lift-gate of the pick-up truck, the rear hatch door of the pick-up truck topper, and a side window of the pick-up truck topper in the open positions.

DESCRIPTION OF THE PREFERRED EMBODIMENTS

Figure 1:
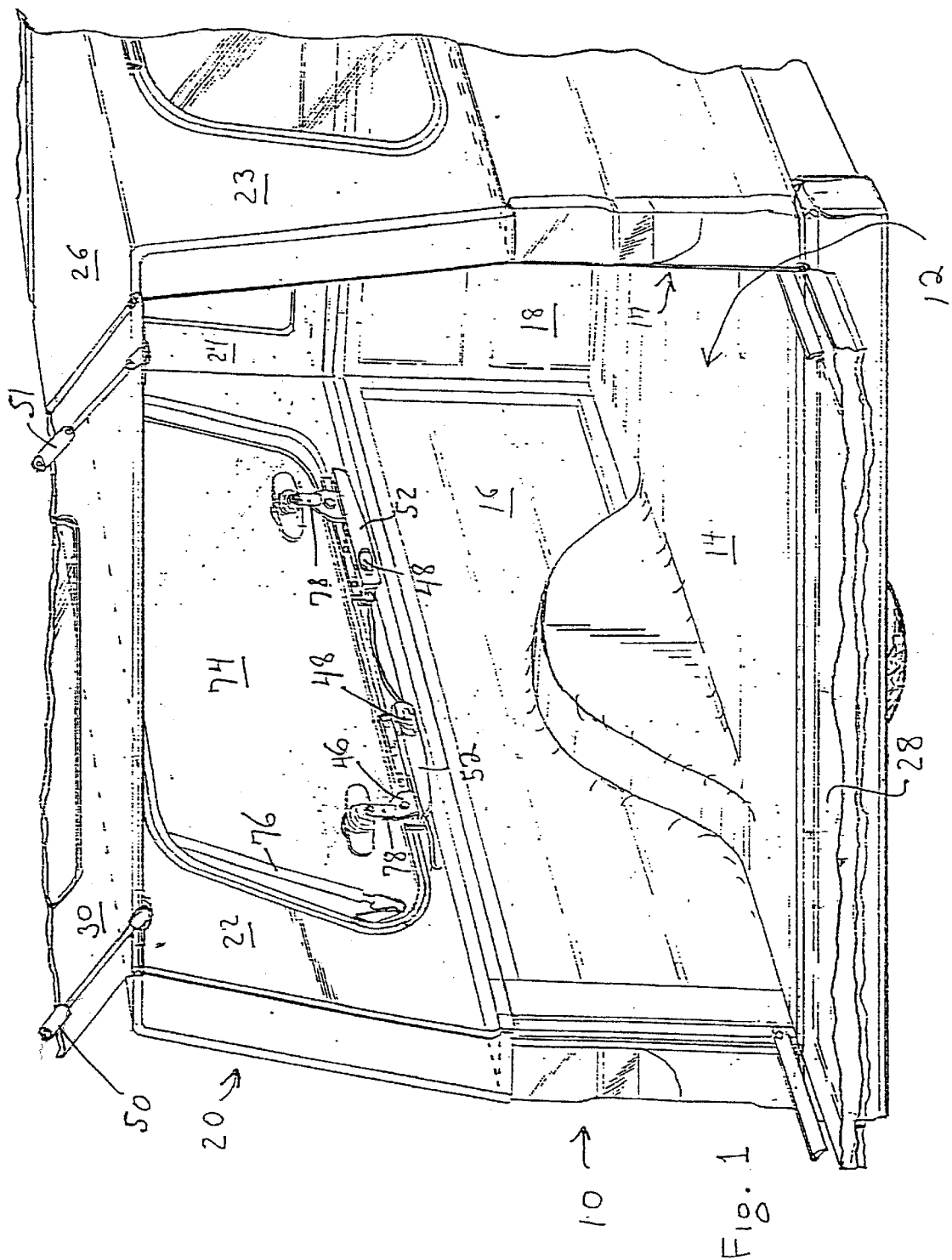
FIG. 1 is a fragmentary, perspective rear view of a pick-up truck having a pick-up truck topper, with the pick-up truck lift-gate and rear hatch door of the pick-up truck topper in the open positions.
Figure 2:
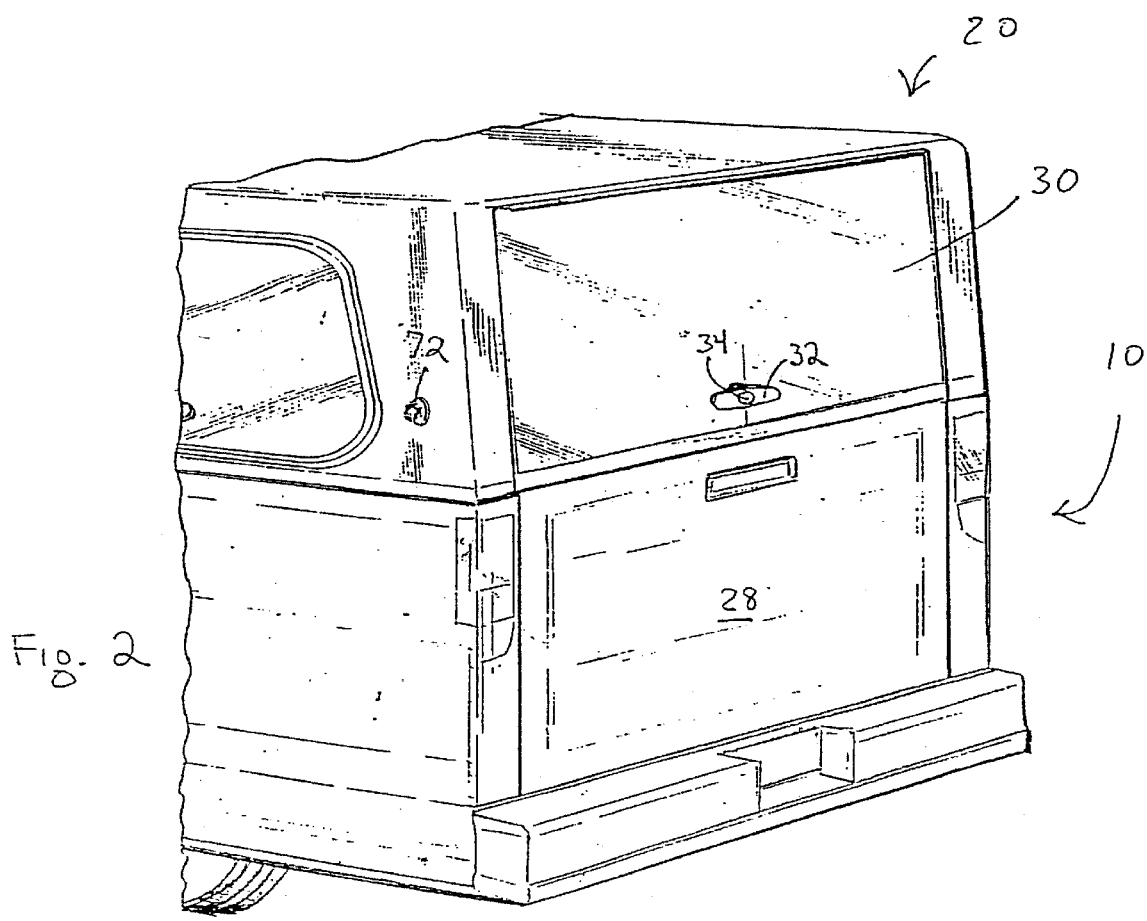
FIG. 2 is a fragmentary rear perspective view of a pick-up truck with a pick-up truck topper, with the lift-gate of the pick-up truck and the rear hatch door of the topper in the closed positions.

In FIG. 1 there is shown a pick-up truck 10 having a cargo space or bed 12 defined by a floor 14, sidewalls 16, 17, and a front wall 18. A truck topper 20 is mounted over bed 12 of the pick-up truck to define an enlarged enclosure. Topper 20 includes side walls 22 and 23 which extend upwardly from side walls 16 and 17 of the pick-up truck, front wall 24 which extends upwardly from front wall 18 of the pick-up truck, and a roof 26. Pick-up truck 10 includes a rear lift-gate 28 which is hinged to the rear end of pick-up truck bed 12 for rotation between an open position as shown in FIG. 1 and a closed position as shown in FIG. 2. Topper 20 includes a rear hatch door 30 which is hinged near the rear edge of roof 26 of topper 20 for rotation between an open position as shown in FIG. 1 and a closed position as shown in FIG. 2. When rear lift-gate 28 is raised to the closed position and rear hatch door 30 is lowered to the closed position as shown in FIG. 2, truck bed 12 and topper 20 together define a substantially weather-tight enclosure which protects cargo contained in the bed of the pick-up truck from precipitation and other environmental elements.

Truck topper 20 is also provided with a lockable latching mechanism including a rotatable handle 32 having a key-operated lock 34. In the illustrated embodiment shown in FIG. 3, the lockable latch mechanism includes a generally circular shaped plate 36 which rotates about a central pivot axis 38 when handle 32 is turned. Latch rods 40, 41 are each pivotably connected at one end thereof to circular plate 36 at points on plate 36 which are radially disposed in opposite directions away from central pivot point 38. Near the ends of latch rods 40 and 41 opposite the ends pivotally connected to circular plate 36 are guides 42 (only one of which is shown) which support and guide rods 40, 41 so that they reciprocate in a generally linear direction along the length of rods 40, 41 between a latched position as shown in FIG. 4 and an unlatched position as shown in FIG. 3.

Figure 4:
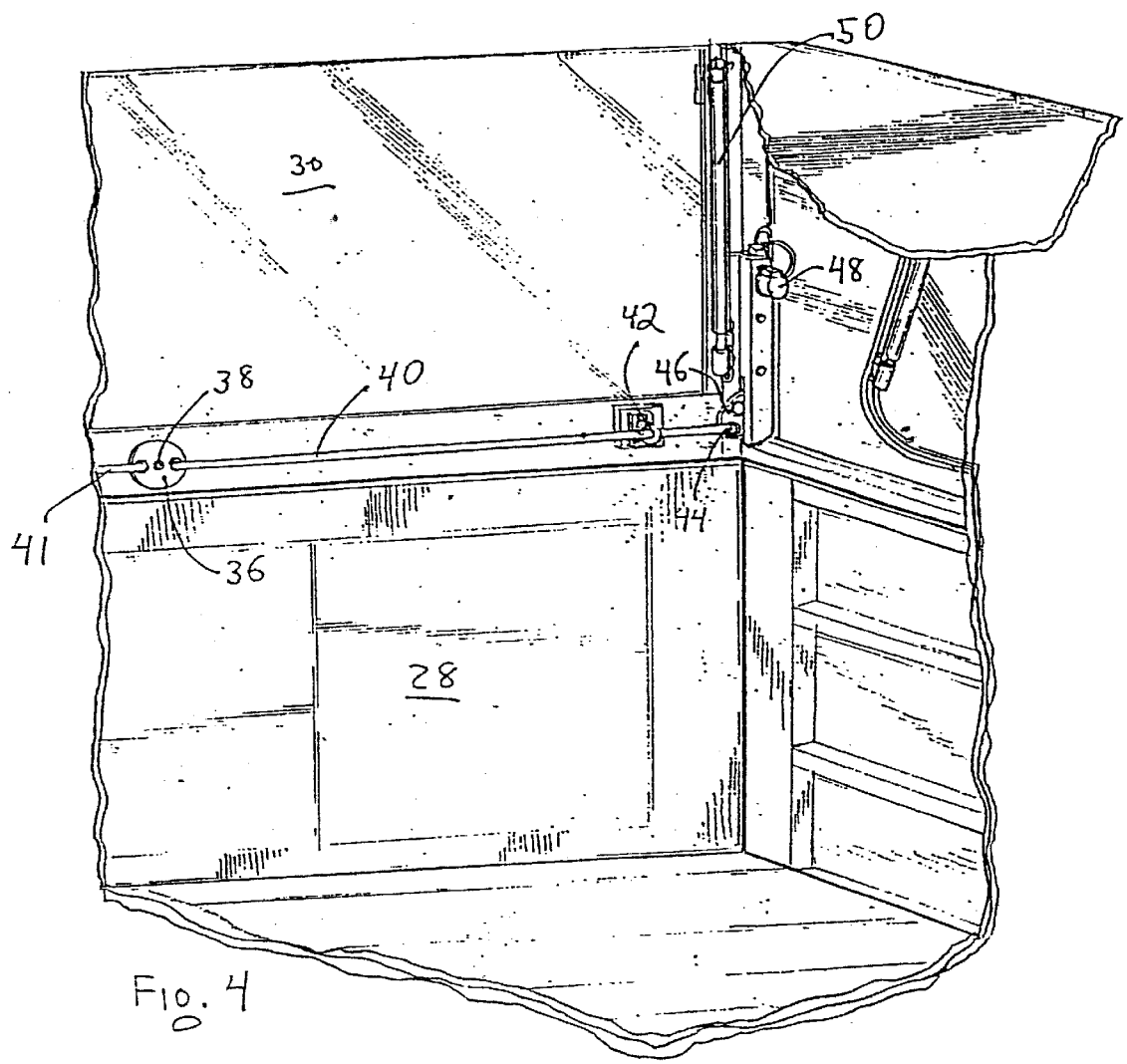
FIG. 4 is a fragmentary, perspective view of the rearward portion of a cargo space defined by the pick-up truck bed and the pick-up truck topper, with the rear hatch door of the pick-up truck topper in the closed position.

In the closed position shown in FIG. 4, the distal end 44 (the end farthest from circular plate 36) engages a movable latch 46 which is mechanically linked to an electrically powered actuator 48. Those skilled in the art will recognize by reference to the drawings, especially FIGS. 4 and 5, that actuator 48 is a motor driven linear actuator. This is evident from the shape and features of actuator 48, especially the motor casing which projects laterally away from the longitudinal direction of piston 60 and linkage rod 62. The motor casing is substantially the only portion of actuator 48 that can be seen in FIG. 4. The remaining portions of actuator 48 are concealed by bracket 52. The use of a motor driven actuator is an important aspect of this invention. As a practical matter, only electrically powered linear actuators are suitable for use in remotely operated locking/latching systems for automotive vehicle closures, such as doors, windows, tonneau covers, etc. Also, solenoids are impractical or unsuitable because of their characteristically low linear displacement or throw which cannot accommodate typical dimensional tolerances and/or load imposed dimensional variances of pick-up truck body components onto which a locking/latching system is mounted.

Figure 3:
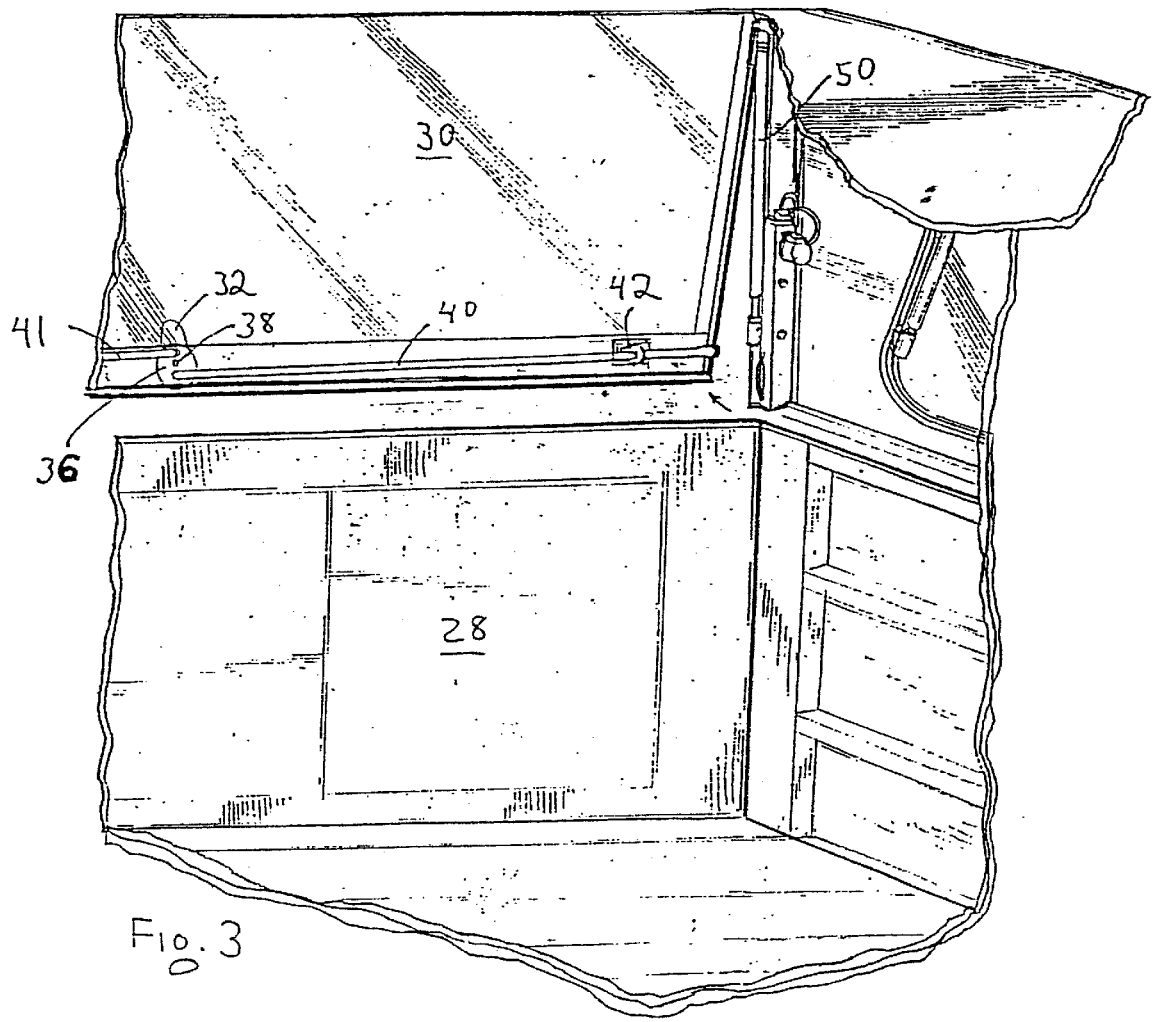
FIG. 3 is a fragmentary, perspective view of the interior rearward portion of the cargo area defined by the pick-up truck bed and the pick-up truck topper, with the rear hatch door of the pick-up truck topper in a partially open position.

Rear hatch door 30 can be rotated from the closed position shown in FIGS. 2 and 4 into an open position as shown in FIGS. 1 and 3 manually by inserting a key into key lock 34, rotating the key lock to the unlocked position, and rotating latch handle 32 to cause plate 36 to rotate and cause latch rods 40, 41 to reciprocate in a direction away from the sides of the pick-up truck so that the distal ends 44 of rods 40 and 41 become disengaged from movable latch 46 allowing rear hatch door 30 to be swung into the open position as shown in FIG. 1, with the assistance of pneumatic cylinders 50, 51 which bias rear hatch door 30 to the open position. Alternatively, a remotely operated locking device generally comprising movable latch 46 mechanically linked to electrically powered actuator 48 can be operated to release rear hatch door 30. More specifically, electrically powered actuator 48 can be activated to move latch 46 away from engagement with distal end 44 of rods 40, 41 to allow rear hatch door 30 to be rotated into an open position without rotating latch handle 32 or reciprocating latch rods 40, 41.

Figure 5:
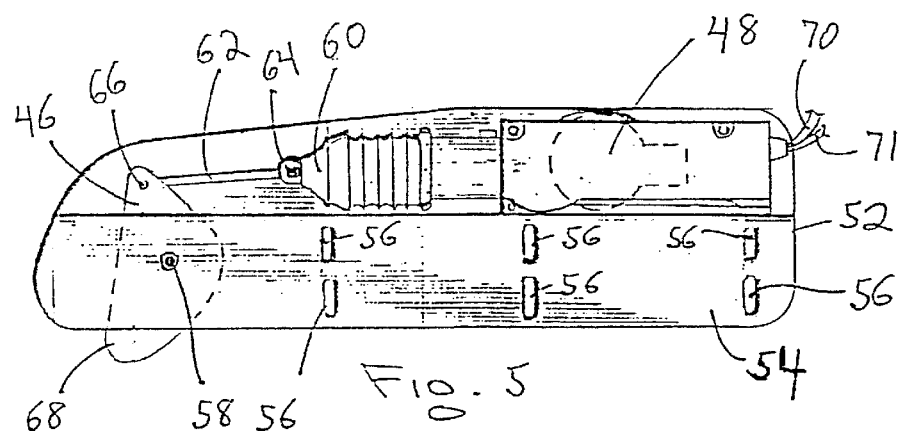
FIG. 5 is a front elevational view of a remotely operated locking device for a pick-up truck topper lift-gate or pick-up truck topper window.

In the illustrated embodiment shown in FIG. 5, the remotely operated locking device includes a mounting bracket 52 onto which is secured electrically powered actuator 48. Bracket 52 includes a mounting flange portion 54 having a plurality of holes or apertures 56 which facilitate mounting of brackets 52 to topper 20 with fasteners, such as screws. Movable latch 46 is rotatably mounted to bracket 52 at pivot 58. Illustrated actuator 48 is a linear actuator including a linearly reciprocatable piston 60 which is mechanically linked to movable latch 46 by a linkage rod 62. More specifically, a first, proximal end 64 of linkage rod 62 is connected to piston 60, and a second distal end 66 of linkage rod 62 is pivotally connected to movable latch 46 at a location offset from pivot point 58 whereby linear displacement of piston 60 upon actuation of electrically powered actuator 48 causes movable latch 46 to rotate between a position in which an end portion 68 of movable latch 46 is in a deployed position in which end portion 68 engages distal end 44 of rod 40, and a retracted position (as shown in FIG. 3) in which end portion 68 is moved out of engagement with distal end 44 of rod 40, allowing rear hatch door 30 to be rotated into an open position. As can be seen by reference to FIG. 5, movable latch 46 is rotatable at pivot 58 around an axis that is perpendicular to the travel direction of piston 60. Electrically powered actuator 48 is electrically connected to the electrical power system of the pick-up truck via electrical conductors 70, 71. Power can be supplied to actuator 48 to rotate movable latch 46 between a locked and an unlocked position as desired. Using well known commercially available devices, actuator 48 can be powered by a remotely located switch or button, such as in the cabin of the pick-up truck, on a radio remote controller, a key-operated switch 72 (FIG. 2), or the like. The locks may also be controlled by a manufacturer-installed door switch and/or a keyless entry system, such as a radio frequency remote controller and/or a vehicle-mounted key pad.

In accordance with another aspect of the invention, the remotely operated locking device may be used for automatically, remotely releasing a vent window 74 from the closed position shown in FIG. 1, to an open position as shown in FIG. 6. Window 74 is hinged along an upper edge thereof to sidewall 22 of topper 20. A pneumatic cylinder 76 biases window 74 into an open position as shown in FIG. 6. Window 74 is retained in a closed position by latch members 78 which engage movable latch 46. With the illustrated embodiment, window 74 can be released and allowed to be swung into the open position as shown in FIG. 6 manually by operating a latch handle (not shown) on the exterior side of topper 20 to cause rotation of latch member 78 out of engagement with movable latch 46. Alternatively, window 74 can be released by powering actuators 48 to cause movable latches 46 to rotate from a deployed position as shown in FIG. 1, to a retracted position as shown in FIG. 6, wherein movable latches 46 disengage from latch member 78 allowing window 74 to open.

In certain embodiments of this invention, a truck closure, such as a pick-up truck topper lift-gate, pick-up truck topper window or pick-up truck tonneau cover, can be locked or unlocked either with a mechanical key lock or an electric lock. If desired, the electrically operated locking devices of this invention can be wired to operate a topper interior light or a tonneau cover interior light. Alternatively, a topper interior light or a tonneau interior light may be turned on or off with a plunger switch that is biased in the "on" position and is engaged by a feature on the lift-gate of a topper or a tonneau cover so that the plunger switch is held in the "off" position when the lift-gate or tonneau cover is closed.

Mechanical arrangements similar to those described herein and shown in the drawings may be used for remotely opening or unlocking a tonneau cover. Such arrangements are intended to be within the scope of this invention.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An electrically operated locking device in combination with a pick-up truck cargo space closure member, comprising:
    an electrically powered motor-driven linear actuator; and
    a movable latch mechanically linked to the actuator, the latch being movable between a locked position in which the latch engages the pick-up truck cargo space closure member and locks the pick-up truck cargo space closure member, and an unlocked position in which the latch releases the pick-up truck cargo space closure member to allow the pick-up truck cargo space closure member to be pivoted to an open position.

2. The electrically operated locking device combination of claim 1, wherein the linear actuator includes a linearly reciprocatable piston, and the movable latch is pivotable with respect to an axis perpendicular to the direction of linear displacement of the reciprocatable piston, whereby operation of the linear actuator effects pivoting motion of the movable latch with respect to said axis.

3. The electrically operated locking device combination of claim 1, wherein the pick-up truck cargo space closure member is a pick-up truck lift-gate.

4. The electrically operated locking device combination of claim 1, wherein the pick-up truck cargo space closure member is a pick-up truck topper window.

5. The electrically operated locking device combination of claim 4, wherein the window is hinged to a pick-up truck topper and pneumatic cylinders bias the window to an open position.

6. The electrically operated locking device combination of claim 1, wherein the pick-up truck cargo space closure member is a pick-up truck lift-gate having a lockable latching mechanism including a handle that is rotatable between a locked and an unlocked position and has a key-operated lock, the lockable latching mechanism including a plate that rotates about a pivot axis when the handle is turned, and wherein a rod is pivotably connected at one end to the plate at a point on the plate that is spaced from the pivot axis of the plate, the other end of the rod engages the movable latch when the movable latch is in the closed position and the handle is in the locked position, whereby the pick-up truck lift-gate can be opened either by operation of the actuator or by manually turning the handle.

7. A pick-up truck having a cargo space:
    a closure member for enclosing the cargo space, said closure member being pivotable between an open and a closed position;
    an electrically powered motor-driven linear actuator; and
    a movable latch mechanically linked to the actuator, the latch being movable between a locked position in which the latch engages the closure member and locks the closure member in the closed position, and a unlocked position in which the latch releases the closure member and allows the closure member to be pivoted to an open position.

8. The pick-up truck of claim 7, wherein the linear actuator includes a linearly reciprocatable piston, and the movable latch is pivotable with respect to an axis perpendicular to the direction of linear displacement of the reciprocatable piston, whereby operation of the linear actuator effects pivoting motion of the movable latch with respect to said axis.

9. The pick-up truck of claim 7, wherein the pick-up truck cargo space closure member is a pick-up truck lift-gate.

10. The pick-up truck of claim 7, wherein the pick-up truck cargo space closure member is a pick-up truck topper window.

11. The pick-up truck of claim 10, wherein the window is hinged to a pick-up truck topper and pneumatic cylinders bias the window to an open position.

12. The pick-up truck of claim 7, wherein the pick-up truck cargo space closure member is a pick-up truck lift-gate having a lockable latching mechanism including a handle that is rotatable between a locked and an unlocked position and has a key-operated lock, the lockable latching mechanism including a plate that rotates about a pivot axis when the handle is turned, and wherein a rod is pivotably connected at one end to the plate at a point on the plate that is spaced from the pivot axis of the plate, the other end engages the movable latch when the movable latch is in the closed position and the handle is in the locked position, whereby the pick-up truck lift-gate can be opened either by operation of the actuator or by manually turning the handle.

* * * * *